(12) United States Patent
Min et al.

(10) Patent No.: US 9,454,284 B2
(45) Date of Patent: Sep. 27, 2016

(54) WEB SERVER FOR SUPPORTING COLLABORATIVE ANIMATION PRODUCTION SERVICE AND METHOD THEREOF

(75) Inventors: Wook-hee Min, Seoul (KR); Yeo-jin Kim, Suwon-si (KR); Eok-soo Shim, Suwon-si (KR); Jin-young Kim, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1574 days.

(21) Appl. No.: 12/292,954

(22) Filed: Dec. 1, 2008

(65) Prior Publication Data

US 2009/0300515 A1 Dec. 3, 2009

(30) Foreign Application Priority Data

Jun. 3, 2008 (KR) ........................ 10-2008-0052070

(51) Int. Cl.
*G06F 3/048* (2013.01)
*G06F 3/0481* (2013.01)
*G06F 17/30* (2006.01)
*G06T 13/00* (2011.01)

(52) U.S. Cl.
CPC ..... *G06F 3/04815* (2013.01); *G06F 17/30873* (2013.01); *G06T 13/00* (2013.01)

(58) Field of Classification Search
CPC .................... G06F 3/04815; G06F 17/30873; G06T 13/00
USPC ........................................................ 715/751
See application file for complete search history.

(56) References Cited

U.S. PATENT DOCUMENTS

| | | | | |
|---|---|---|---|---|
| 5,148,154 A | * | 9/1992 | MacKay | G06F 3/0481 345/156 |
| 5,655,067 A | * | 8/1997 | Takahashi et al. | 345/473 |
| 5,680,619 A | * | 10/1997 | Gudmundson et al. | 717/108 |
| 5,986,675 A | * | 11/1999 | Anderson | G06T 13/20 345/473 |
| 6,158,903 A | * | 12/2000 | Schaeffer et al. | 709/204 |
| 6,208,357 B1 | * | 3/2001 | Koga et al. | 345/473 |

(Continued)

FOREIGN PATENT DOCUMENTS

| | | |
|---|---|---|
| KR | 1020020025448 A | 4/2002 |
| KR | 20060030179 A | 4/2006 |
| KR | 20080041934 A | 5/2008 |

OTHER PUBLICATIONS

Naver Blog (blog.naver.com/mooka85/60037318808), published on May 8, 2007.

(Continued)

*Primary Examiner* — William Bashore
*Assistant Examiner* — Gregory A Distefano
(74) *Attorney, Agent, or Firm* — Harness, Dickey & Pierce, P.L.C.

(57) ABSTRACT

A web server for supporting a collaborative animation production service. The web server includes a user interface (UI) unit to provide a UI to receive direction data for each scene required for animation production in parallel to users connected to the web server, and a generating unit to combine the direction data input to the UI for each scene and generate an animation corresponding to the combined direction data. A plurality of users thereby collaborate to produce an animation in real time, making it possible to shorten the production time of the animation and produce a high quality animation.

23 Claims, 5 Drawing Sheets

(56) References Cited

U.S. PATENT DOCUMENTS

| | | | |
|---|---|---|---|
| 6,690,376 B1* | 2/2004 | Saito et al. | 345/473 |
| 6,924,803 B1* | 8/2005 | Girling et al. | 345/473 |
| 6,948,131 B1* | 9/2005 | Neven et al. | 715/753 |
| 7,596,598 B2* | 9/2009 | Birch | 709/205 |
| 2003/0088623 A1* | 5/2003 | Kusuda | 709/204 |
| 2006/0055700 A1* | 3/2006 | Niles et al. | 345/473 |
| 2006/0181535 A1* | 8/2006 | Watt | 345/473 |
| 2007/0005694 A1* | 1/2007 | Popkin et al. | 709/204 |
| 2007/0146367 A1* | 6/2007 | Harvey, Jr. | G06T 13/00 345/473 |
| 2008/0028312 A1* | 1/2008 | Alvarez et al. | 715/719 |
| 2008/0159708 A1* | 7/2008 | Kazama et al. | 386/69 |
| 2008/0244418 A1* | 10/2008 | Manolescu et al. | 715/753 |
| 2009/0219291 A1* | 9/2009 | Lloyd | G06T 13/20 345/427 |
| 2010/0174783 A1* | 7/2010 | Zarom | 709/205 |

OTHER PUBLICATIONS

Korean Office Action dated Nov. 21, 2014 issued in corresponding Korean Application No. 10-2008-0052070 (with English translation).

* cited by examiner

| | | | | | |
|---|---|---|---|---|---|
| 31— scene 1 | scene 2 | scene 3 | scene 4 | ... | scene N |
| 32— WRITE | WRITE | ///// | ///// | WRITE | WRITE |
| 33— PREVIEW | PREVIEW | PREVIEW | PREVIEW | PREVIEW | PREVIEW |

| scene / Part | 1 | 2 | 3 | ... | N |
|---|---|---|---|---|---|
| CHARACTER 1 | ///// | | | | |
| CHARACTER 2 | ///// | ///// | | | |
| CAMERA | ///// | | | | |
| ⋮ | ⋮ | ⋮ | ⋮ | ⋮ | ⋮ |
| BACKGROUND PROPERTIES | ///// | | | | |
| PREVIEW | PREVIEW | PREVIEW | PREVIEW | PREVIEW | PREVIEW |

FIG. 4A

```
# Scene 1
1. (BOB SEES MARY.)
   character:look(name=BOB, what=MARY)

2. (MARY SEES BOB.)

3. (CAMERA SHOWS BOB AND MARY THROUGH TOWSHOT.)

4. BOB SEES MARY AND SAYS SHE IS BEAUTIFUL.
                                                FINISH
```

FIG. 4B

```
# Scene 1
1. (BOB SEES MARY.)
   character:look( name=BOB, what=MARY )

camera: closeup( name=Acam, what=BOB,
   dolly=on, style=servo, speed=1.00,
   transition=continuous, wait=no )

2. (MARY SEES BOB.)
   character:look(name=MARY, what=BOB )

3. (CAMERA SHOWS BOB AND MARY THROUGH TOWSHOT.)
   camera: twoshot( name=Acam, name1=BOB,
   name2=MARY, speed=0.76, style=uniform,
   transition=continuous, dolly=off )

4. BOB SEES MARY AND SAYS SHE IS BEAUTIFUL.
                                                FINISH
```

WEB SERVER FOR SUPPORTING COLLABORATIVE ANIMATION PRODUCTION SERVICE AND METHOD THEREOF

CROSS-REFERENCE TO RELATED APPLICATIONS

This application claims the benefit of Korean Application No. 2008-52070, filed Jun. 3, 2008, in the Korean Intellectual Property Office, the disclosure of which is incorporated herein by reference.

BACKGROUND

1. Field

Aspects of the present invention relate to a web server for supporting a collaborative animation production service and a method thereof, and more particularly, to a web server for supporting a collaborative animation production service by which a plurality of users collaborate to produce an animation, and a method thereof.

2. Description of the Related Art

Production and distribution of user generated content (UGC) have recently been revitalized, so user demand for methods capable of producing, revising and sharing content more easily have increased. A user created animation is one sort of UGC, and programs required for animation production have been steadily developed.

Conventional animation has been generally produced based on an individual scenario, which causes the problems that a producer needs professional education and training for direction (instruction), and a lot of time may be required according to the scale of the animation. Also, even if the animation is produced by two or more users, the animation is produced by sequential collaborative work rather than by collaborative work in real time, thereby leading to problems of having efficient animation collaborative production.

SUMMARY

Additional aspects and/or advantages will be set forth in part in the description which follows and, in part, will be apparent from the description, or may be learned by practice of the invention.

Aspects of the present invention relate to a web server for supporting a collaborative animation production service by which a plurality of users collaborate in real time to produce an animation, and a method thereof.

According to an exemplary embodiment of the present invention, there is provided a web server for supporting an animation production service, the web server including a user interface (UI) unit to provide a UI to receive direction data for scenes used for animation production from users connected to the web server, and a generating unit to combine the direction data input to the UI for the scenes and generate an animation corresponding to the combined direction data.

The UI may set scene numbers of an animation script for the scenes as a first axis and set each part pertaining to the animation production as a second axis which is perpendicular to the first axis.

If an intersection area of the first axis and the second axis is selected by at least one user, the UI may provide a second UI to input the direction data of the scenes and part corresponding to the selected area to the at least one user.

If the direction data is input using the second UI, the UI may change the display conditions of the intersection area corresponding to the scene and part to which the direction data is input.

The second UI may be provided for sentences on the animation script, describing the scene corresponding to the selected area.

The second UI may receive only script command and property pertaining to the part corresponding to the selected area.

If the second UI is provided to a plurality of users, the web server may further include a control unit to synchronize the second UI provided to users, in order that the direction data input by users can be displayed on the second UI provided to other users.

The UI may include a plurality of selection areas classified according to each scene number of the animation script.

The UI may change the display conditions of one selection area of the plurality of selection areas, corresponding to the scene to which the direction data is input.

If at least one of the plurality of selection areas is selected by at least one user, the UI unit may provide the second UI to input the direction data of the scene corresponding to the selected selection area to the at least one user.

The direction data may be drawn up in Television Program Making Language (TVML).

The web server may further include a chat processing unit to provide a chatting window to the users connected to the web server.

According to another exemplary embodiment of the present invention, there is provided a method for supporting an animation production service of a web server, the method providing a UI to receive direction data for each scene used for animation production from users connected to the web server, and combining the direction data input to the UI for scenes and generating an animation corresponding to the combined direction data.

The UI may set each scene number of an animation script as a first axis and set each part pertaining to the animation production as a second axis which is perpendicular to the first axis.

If an intersection area of the first axis and the second axis is selected by at least one user, the providing of the UI may further include providing a second UI to input the direction data of the scene and part corresponding to the selected area to the at least one user.

If the direction data is input using the second UI, the providing of the UI may further include changing the display conditions of the intersection area corresponding to the scene and part to which the direction data is input.

The second UI may receive only script commands and properties pertaining to the part corresponding to the selected area.

If the second UI is provided to a plurality of users, the method may further include synchronizing the second UI provided to each user, in order that the direction data input by each user can be displayed on the second UI provided to other users.

The providing of the UI may further include changing display conditions of one selection area of the plurality of selection areas, corresponding to the scene to which the direction data is input.

If at least one of the plurality of selection areas is selected by at least one user, the providing of the UI may further include providing the second UI to input the direction data of the scene corresponding to the selected selection area to the at least one user.

If the second UI is provided to a plurality of users, the method may further include synchronizing the second UI provided to each user, in order that the direction data input by each user can be displayed on the second UI provided to other users.

The method may further include providing a chatting window to the users connected to the web server.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings of which:

FIGS. 3A-B and 4A-B exemplarily illustrate an user interface (UI) showing the structure of a web server according to an exemplary embodiment of the present invention;

DETAILED DESCRIPTION OF EMBODIMENTS

Figure 1:
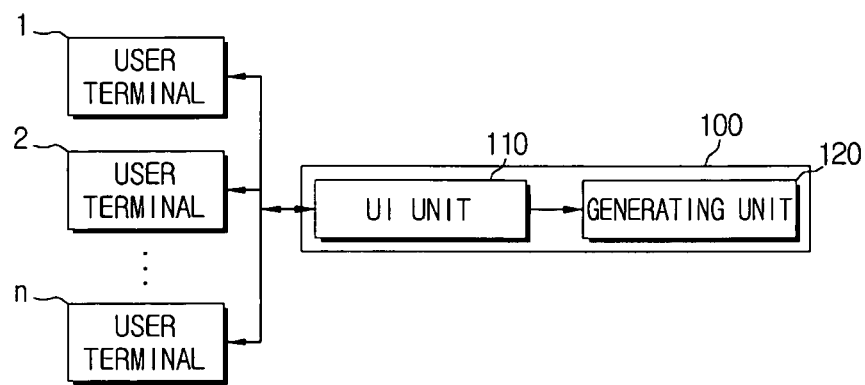
FIG. 1 is a block diagram illustrating the structure of a web server according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below in order to explain the aspects of the present invention by referring to the figures.

FIG. 1 is a block diagram illustrating the structure of a web server according to an exemplary embodiment of the present invention. Referring to FIG. 1, a web server 100 includes a user interface (UI) unit 110 and a generation unit 120. The web server 100 is also connected to a plurality of user terminals 1 to n through a network, making it possible to provide various services to users and provide services requested by the users to web pages of the corresponding user terminals 1 to n. The web server 100 may provide an animation production service to users in the present invention.

Here, a host device, a mobile communication terminal, and so on connectable to the web server 100 through a network may be used as the user terminals 1 to n.

A user may collect scripts relevant to the animation production and persons in charge of parts through a board, or the like on the web page provided by the web server 100 providing the animation production service. The persons in charge of parts may direct cameras for the animation production, property masters, a plurality of characters shown in the script, and lighting.

If the script and the persons in charge of parts are determined, the web server may provide a UI for animation production based on the script. Here, the script is written for scenes.

The UI unit 110 provides a UI to receive direction data for each scene used for animation production from users connected to the web server 100. When a plurality of users simultaneously use the UI, the users may input direction data using the UI provided to respective user terminals 1 to n, and the input direction data may be broadcast to the user terminals by which users participate in the animation production, and thus may be updated in real time. Here, the UI users may be the persons in charge of parts.

The direction data may be a script drawn up in Television Program Making Language (TVML). The direction data may also be text or image/voice data input through external devices such as a camera, a speaker, a data transmitter and so on. In this case, a conversion device which can convert the input image/voice data or the text into the corresponding TVML is additionally required.

The generating unit 120 combines the direction data input to the UI for each scene and generates an animation corresponding to the combined direction data.

Even a user among the users using the user terminals 1 to n connected to the web server 100, who does not participate in the animation production, may see the animation generated by the generating unit 1220 according to free/charged services, and propose opinions on the animation.

Figure 2:
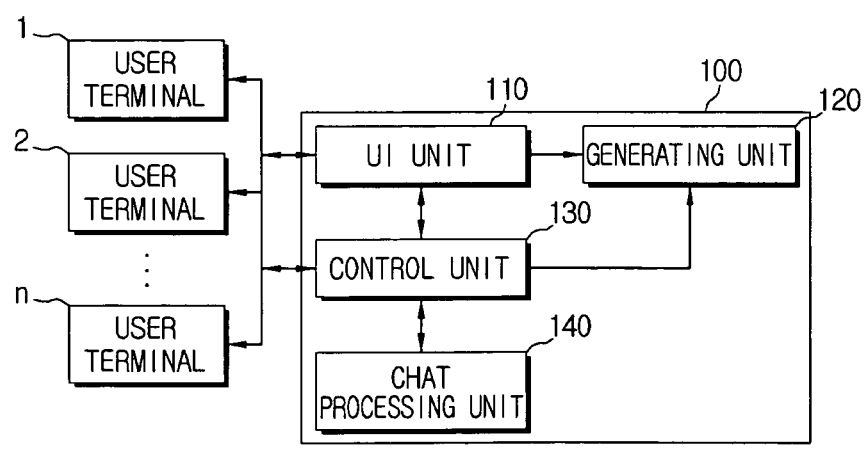
FIG. 2 is a block diagram illustrating the structure of a web server according to another exemplary embodiment of the present invention.

FIG. 2 is a block diagram illustrating a construction of a web server according to another exemplary embodiment of the present invention. Referring to FIG. 2, a web server 100 may further include a control unit 130 and a chat processing unit 140. A UI unit 110 and a generating unit 120 may perform the same functions as those in FIG. 1. Here, the UI may be implemented as shown in FIGS. 3A and 3B. This is merely an exemplary embodiment of the present invention, and the UI can be implemented in diverse forms.

Referring to FIG. 3A, a UI 30 includes a plurality of selection areas 32 classified according to each scene number 31 of an animation script and preview areas 33 in which each scene may be previewed. The scenes of the script are classified from 1 to N as shown in FIG. 3A, persons in charge of each part may select one of the corresponding selection areas 32 and input direction data to the selection area. Here, the selection areas corresponding to the scenes drawn up by the user may be changed and displayed in color, and the areas to which the direction data is not input may be displayed as write buttons. The areas which are changed and displayed in color can be edited.

The preview areas 33 receive instructions to reproduce the animation corresponding to the TVML script drawn up by the users for the corresponding scenes. If the preview areas 33 are selected, the generating unit 120 interprets and reproduces the TVML script drawn up for the corresponding scenes.

Referring to FIG. 3B, according to another exemplary embodiment of the present invention, a UI 40 may set each scene number of an animation as a first axis and set each part pertaining to the animation production as a second axis which is perpendicular to the first axis. The UI 40 also includes a plurality of selection areas in which the first axis intersects the second axis, and preview areas in which each scene can be previewed.

If the selection area of the provided UI is selected by the user, a UI unit 110 provides a second UI to input direction data corresponding to the selected area to user terminals 1 to n. In other words, in the case of FIG. 3A, if at least one of the plurality of selection areas 32 is selected by one user, the second UI to input direction data corresponding to the selected selection area may be provided. In the case of FIG. 3B, if the area at which the first axis intersects the second axis is selected by at least one user, the second UI to input direction data of the scene and part corresponding to the selected area may be provided to the least one user.

Here, the second UI may be provided for each sentence on the animation script, describing the scene corresponding to the selected area. Here, each sentence may be given with an ID according to its order.

When the second UI is provided to the plurality of users, the control unit 130 synchronizes the second UI provided to each user, in order that the direction data input by each user can be displayed on the second UI provided to other users. The exemplary embodiments for the second UI will be described with reference to FIGS. 4A and 4B.

FIG. 4A shows an example of a person in charge of characters among persons in charge of parts inputting direction data with respect to scene 1. In other words, FIG. 4A may be a second UI provided to the user terminal of the person in charge of characters. FIG. 4B shows an example of a person in charge of cameras inputting direction data with respect to scene 1. FIG. 4B may be a second UI provided to the user terminal of the person in charge of cameras. Here, FIG. 4B shows conditions in which the input of the direction data by the person in charge of characters of FIG. 4A is updated and synchronized.

Here, the second UI, which displays sentences of scene 1 with the ID numbers 1, 2, 3 and 4, may display a scroll bar on one side, if a display area of input areas for inputting direction data for each sentence exceeds a preset size, and the second UI may scroll the input areas according to movement of the scroll bar.

If a predetermined selection area is selected by a user in the UI of FIG. 3B, a control unit 130 may control a UI unit 110 to receive only script commands and properties pertaining to the part corresponding to the selection area from the second UI.

In other words, if a selection area in which scene 1 on a first axis intersects a camera part on a second axis is selected, the second UI to input direction data for scene 1 is provided. Here, the second UI receives only script commands and properties relevant to cameras, and blocks script commands and properties relevant to other parts not to be input. Also, the second UI records and classifies parts of users drawing up the TVML script.

Accordingly, the users draw up the direction data pertaining only to the corresponding part, making it possible to prevent errors from occurring. The direction data can be input without classifying the parts of users in the UI of FIG. 3A.

Figure 5A:
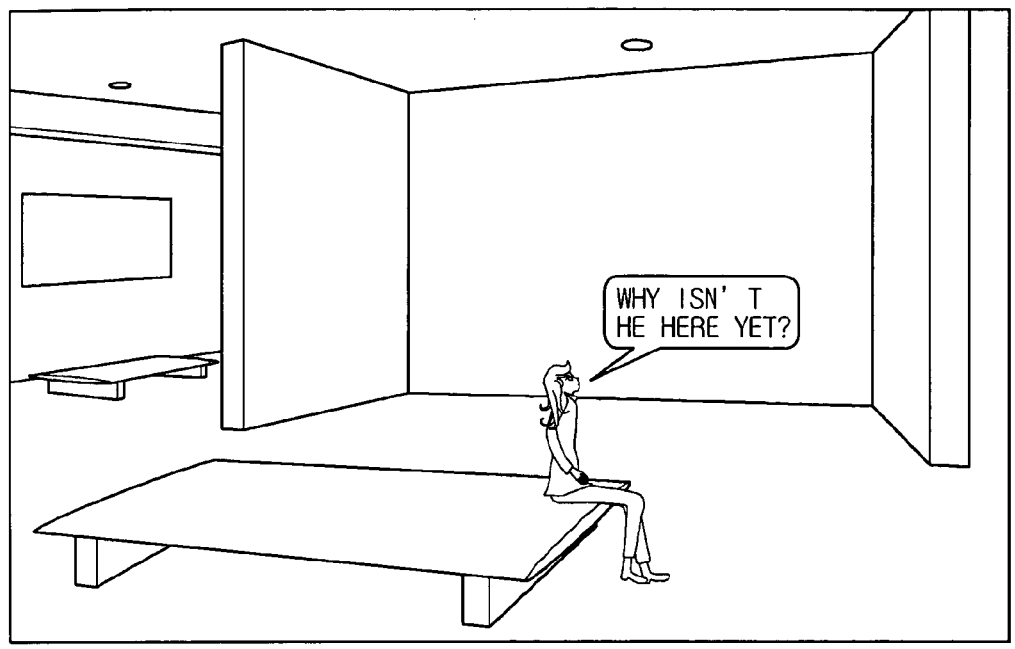
FIGS. 5A and 5B exemplarily illustrate animation production according to an exemplary embodiment of the present invention.
Figure 5B:
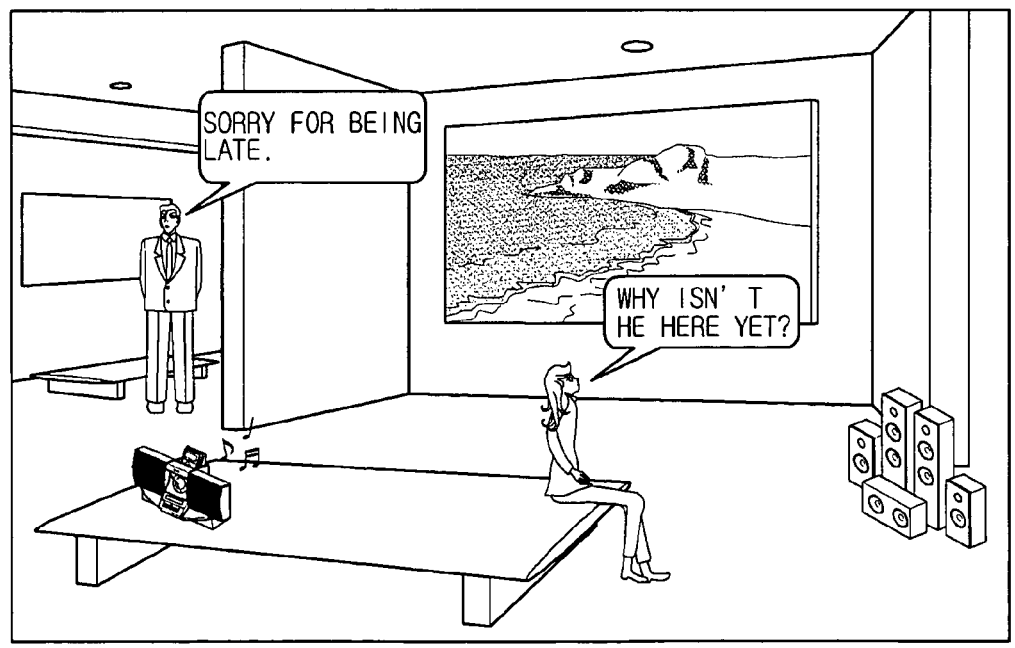

FIGS. 5A and 5B show animations executed corresponding to the direction data drawn up for a scene by means of a preview function provided by the UI of FIGS. 3A and 3B. In other words, if FIG. 5A is an animation for scene 1, and FIG. 5B is an animation for scene 2, FIG. 5A is a preview image executed by a TVML script that is drawn up by a user corresponding to character 1 and background properties using the second UI. FIG. 5B is also a preview image executed by a TVML script that is additionally drawn up by a user corresponding to character 2 and object properties to the TVML script of FIG. 5A.

The chat processing unit 140 provides a chatting window on user terminals 1 to n of the user connected to the web server 100 and transmits and receives messages between the users. Persons in charge of each part may thereby propose their opinions and so on regarding the animation production in real time.

When all the direction data for each scene corresponding to the script are input using the UI, the generating unit 120 interprets the direction data for each scene using a scene combination program to generate an animation.

In conclusion, a plurality of users share their roles for each respective part to produce the animation regardless of the development of other user's of direction data, thereby making it possible to shorten the time for animation production. Furthermore, the users transmit and receive their opinions in real time, thereby making it possible to produce high quality animation.

Figure 6:
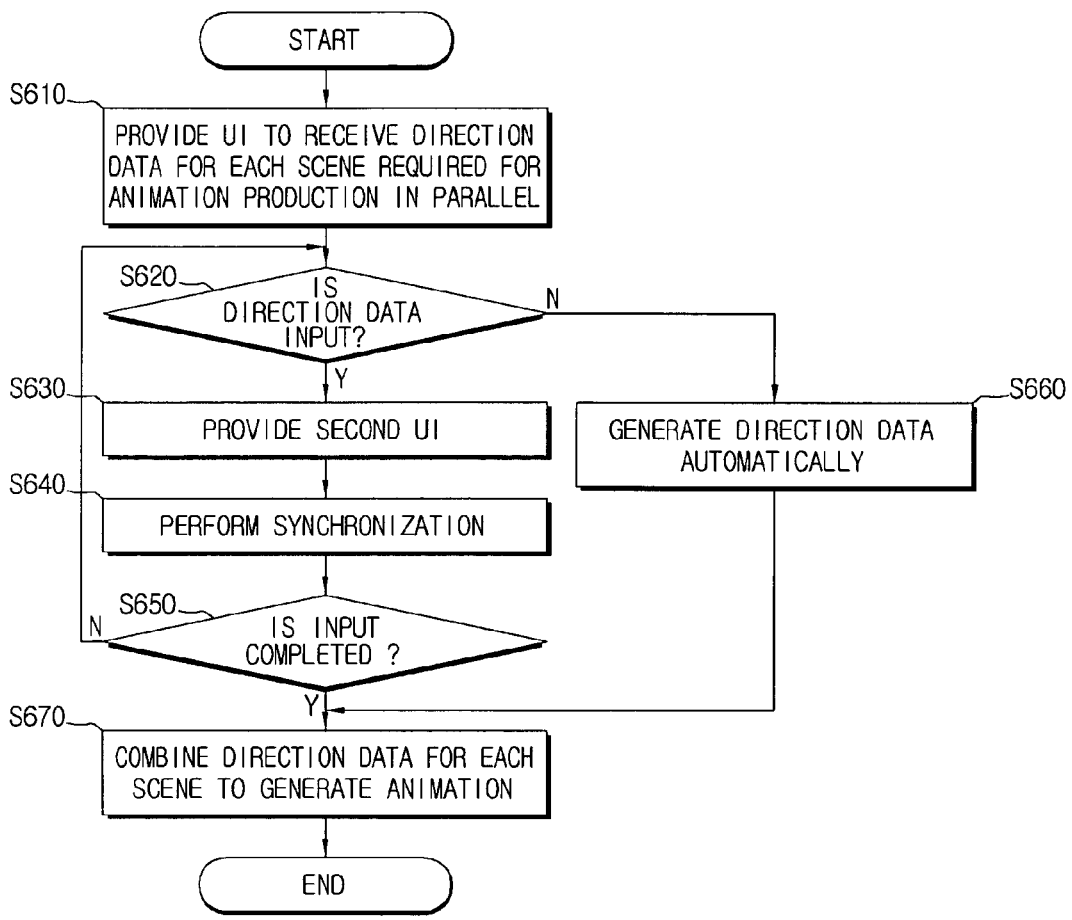
FIG. 6 is a flowchart explaining a method of an animation production service of a web server according to an exemplary embodiment of the present invention.

FIG. 6 is a flowchart explaining a method of an animation production service of a web server according to an exemplary embodiment of the present invention. Referring to FIG. 6, a UI to receive direction data for each scene required for animation production in parallel is provided in operation S610. Here, the UI is generated based on each scene and parts for direction on a script.

Next, if a user requests to input the direction data for a predetermined scene in operation S620, a second UI is provided in operation S630, to allow the direction data to be input. Here, the second UI provides input areas for each sentence on the script, describing a predetermined scene selected by the user.

Here, when a plurality of users request to input the direction data and thus the second UI is provided to a plurality of user terminals in operation S630, the direction data input by the plurality of users are broadcast to the user terminal of the user relevant to the animation production to perform synchronization in operation S640.

When persons in charge of parts relevant to the animation production are not appointed, the web server automatically generates the direction data based on the script of the corresponding part in operation S660.

If the input of the direction data for one animation is completed in S650, the direction data drawn up for each scene are combined to generate the animation in operation S670.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A web server for supporting an animation production service, the web server comprising:
    a processor including:
    a user interface (UI) unit to provide a UI to respective users for selecting a scene of an animation script, and upon the selection, provide a second UI to the respective users to receive direction data pertaining to a corresponding production part of animation production based on the animation script for the selected scene used for the animation production from users connected to the web server; and a generating unit to combine the direction data inputted to the UI by each of the users for the scene and generate an animation corresponding to the combined direction data, wherein the second UI is configured to receive only script commands and properties pertaining to the corresponding production part for the selected scene.

2. The web server of claim 1, wherein the UI sets scene number of the animation script as a first axis and sets each part pertaining to the animation production as a second axis which is perpendicular to the first axis.

3. The web server of claim 2, wherein if an intersection area of the first axis and the second axis is selected by at least one user, the UI provides the second UI to input the direction data of the scene and part corresponding to the selected area to the at least one user.

4. The web server of claim 3, wherein if the direction data is input using the second UI, the UI changes display conditions of the intersection area corresponding to the scene and part to which the direction data is input.

5. The web server of claim 3, wherein the second UI is provided for each sentence on the animation script, describing the scene corresponding to the selected area.

6. The web server of claim 3, further comprising:
if the second UI is provided to a plurality of users, a control unit to synchronize the second UI provided to each user, in order that the direction data input by each user can be displayed on the second UI provided to other users.

7. The web server of claim 1, wherein the UI includes a plurality of selection areas classified according to each scene number of the animation script.

8. The web server of claim 7, wherein the UI changes display conditions of the selection area of the plurality of selection areas, corresponding to the scene to which the direction data is input.

9. The web server of claim 7, wherein if at least one of the plurality of selection areas is selected by at least one user, the UI unit provides the second UI to input the direction data of the scene corresponding to the selected selection area to the at least one user.

10. The web server of claim 7, wherein the second UI is provided for each sentence on the animation script, describing the scene corresponding to the selected area.

11. The web server of claim 7, further comprising:
if the second UI is provided to a plurality of users, a control unit to synchronize the second UI provided to each user, in order that the direction data input by each user can be displayed on the second UI provided to other users.

12. The web server of claim 1, wherein the direction data is drawn up in TV program making language (TVML).

13. The web server of claim 1, further comprising:
a chat processing unit to provide a chatting window to the users connected to the web server.

14. A method for supporting an animation production service of a web server, the method comprising:
providing a UI to respective users for selecting a scene of an animation script, and upon the selection, providing a second UI to the respective users to receive direction data pertaining to a corresponding production part of animation production based on the animation script for the selected scene used for the animation production from users connected to the web server; and combining the received direction data inputted to the UI by each of the users for the scene and generating an animation corresponding to the combined direction data, wherein the second UI is configured to receive only script commands and properties pertaining to the corresponding production part for the selected scene.

15. The method of claim 14, wherein the UI sets each scene number of the animation script as a first axis and sets each part pertaining to the animation production as a second axis which is perpendicular to the first axis.

16. The method of claim 15, wherein if an intersection area of the first axis and the second axis is selected by at least one user, the providing of the UI further comprises providing a second UI to input direction data of the scene and part corresponding to the selected area to the at least one user.

17. The method of claim 16, wherein if the direction data is input using the second UI, the providing of the UI further comprises changing display conditions of the intersection area corresponding to the scene and part to which the direction data is input.

18. The method of claim 16, further comprising:
if the second UI is provided to a plurality of users, synchronizing the second UI provided to each user, in order that the direction data input by each user can be displayed on the second UI provided to other users.

19. The method of claim 16, wherein the UI includes a plurality of selection areas classified according to each scene number of the animation script.

20. The method of claim 19, wherein the providing of the UI further comprises changing display conditions of the selection area of the plurality of selection areas, corresponding to the scene to which the direction data is input.

21. The method of claim 19, wherein if at least one of the plurality of selection areas is selected by at least one user, the providing of the UI further comprises providing the second UI to input the direction data of the scene corresponding to the selected selection area to the at least one user.

22. The method of claim 21, further comprising:
if the second UI is provided to a plurality of users, synchronizing the second UI provided to each user, in order that the direction data input by each user can be displayed on the second UI provided to other users.

23. The method of claim 14, further comprising: providing a chat window to the users connected to the web server.

* * * * *